Feb. 9, 1937.     S. G. STUCKEY     2,069,982
METHOD OF FEEDING GLASS AND AN APPARATUS THEREFOR
Filed April 7, 1934     5 Sheets-Sheet 4
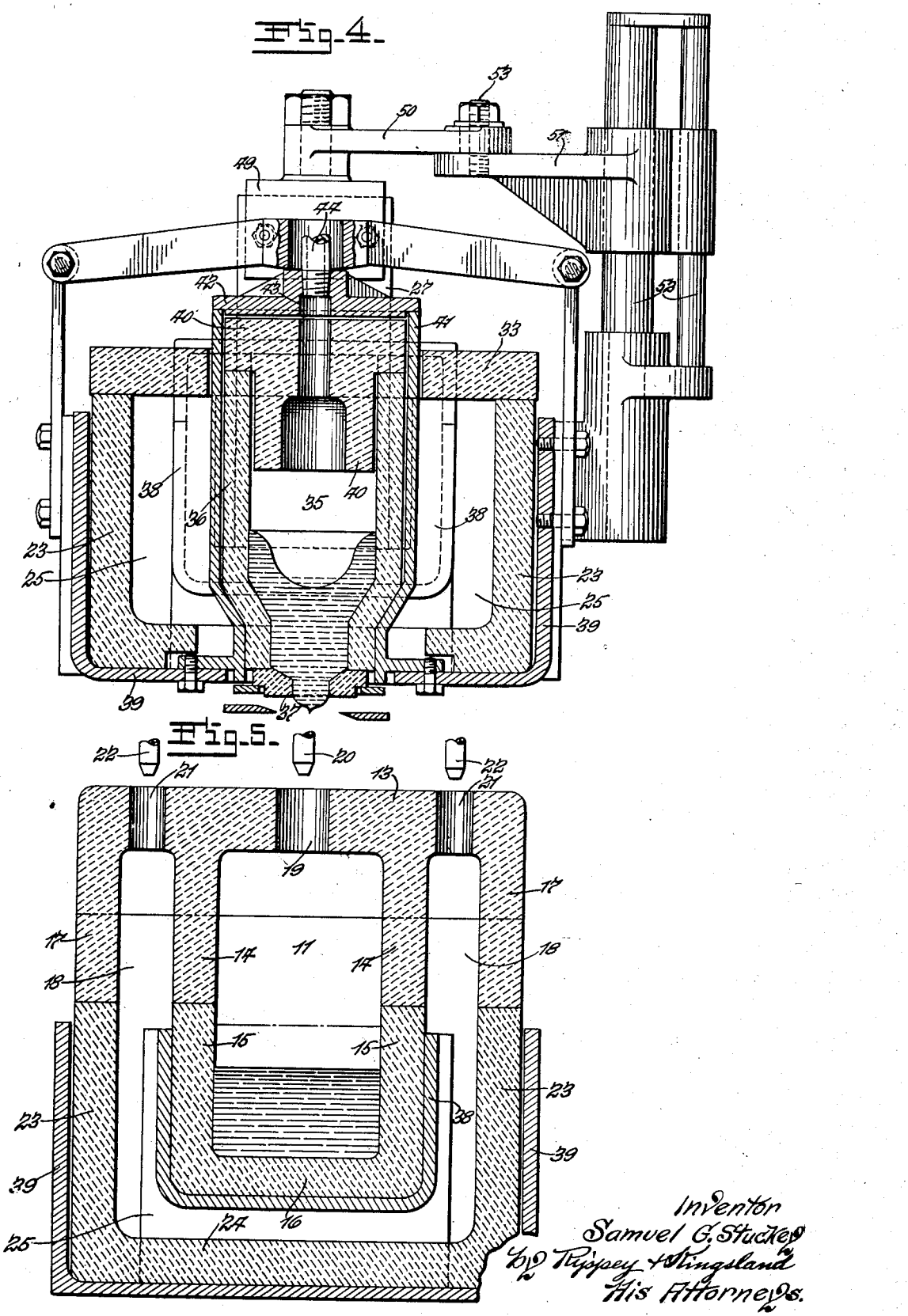

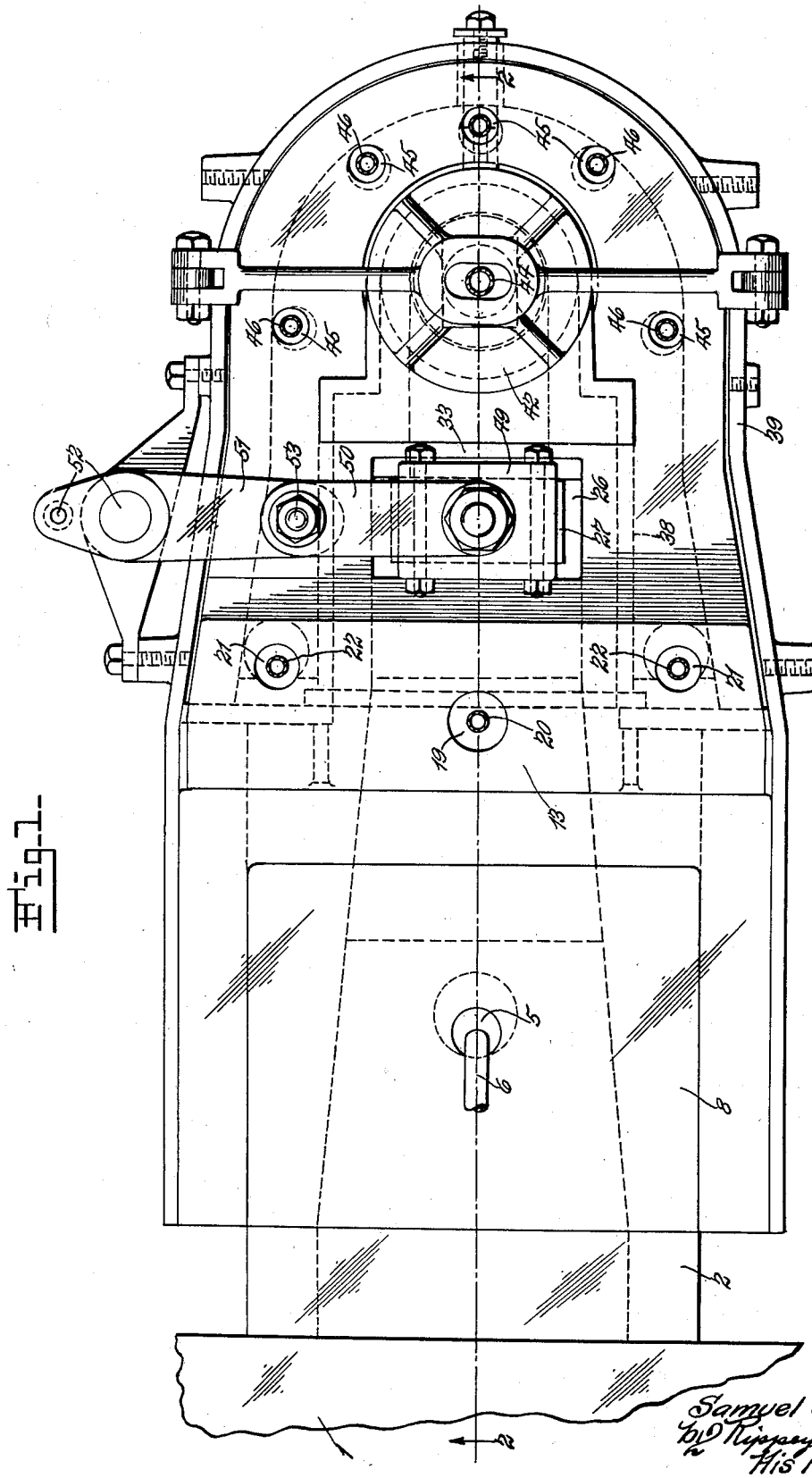

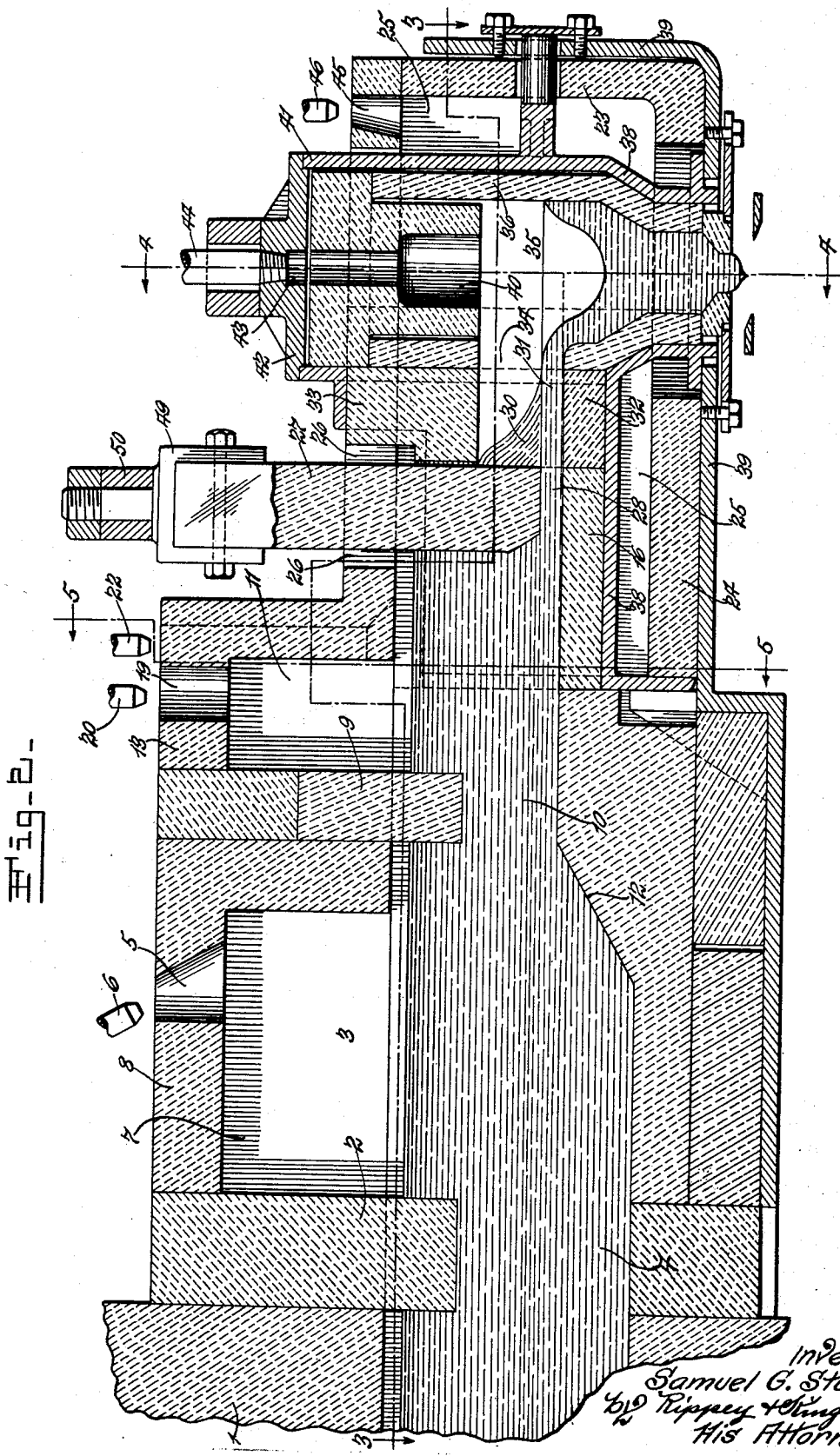

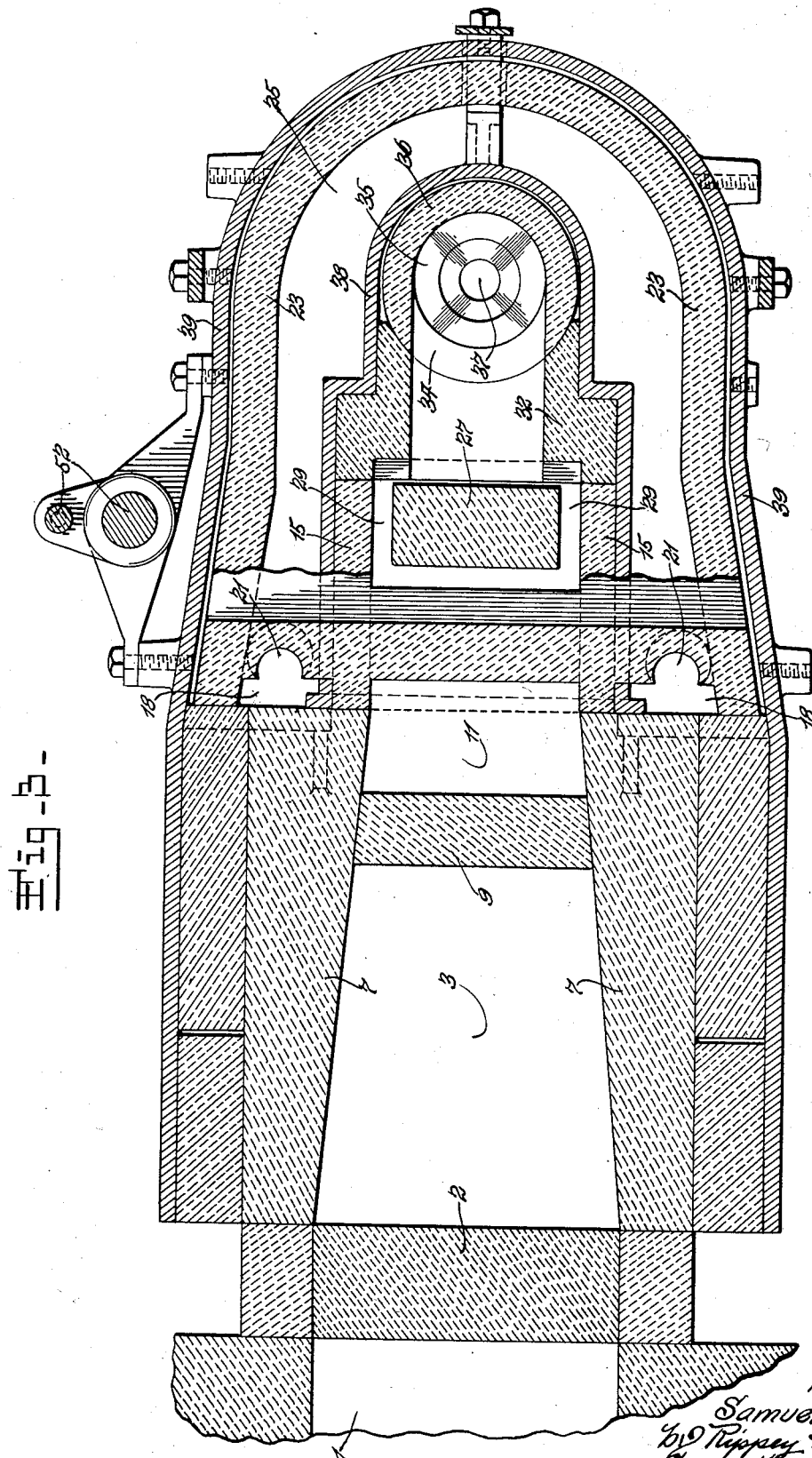

Feb. 9, 1937.   S. G. STUCKEY   2,069,982
METHOD OF FEEDING GLASS AND AN APPARATUS THEREFOR
Filed April 7, 1934   5 Sheets-Sheet 5

Fig. 6.

Inventor
Samuel G. Stuckey
by Rippey & Kingsland
His Attorneys.

Patented Feb. 9, 1937

2,069,982

UNITED STATES PATENT OFFICE 2,069,982

METHOD OF FEEDING GLASS AND AN APPARATUS THEREFOR

Samuel G. Stuckey, St. Louis, Mo., assignor to Obear-Nester Glass Company, St. Louis, Mo., a corporation of Missouri Application April 7, 1934, Serial No. 719,424

16 Claims. (Cl. 49—55)

This invention relates to method of feeding glass and an apparatus therefor.

Heretofore there has been quite considerable difficulty in the art of feeding molten glass, which difficulty has continued to the present time, in correcting uneven temperature in the stream of the molten glass passing and delivered to the outlet or to the severing point. The uneven temperature is caused and arises after the molten glass issues from the furnace proper and before the molten glass reaches the severing point, since in the ordinary forehearth heretofore used in order to maintain a high temperature fire is applied only to the top surface of the molten glass. As a consequence of the fact that fire is applied only to the top surface of the molten glass, the glass at the bottom of the forehearth becomes colder or assumes a lower temperature than that at the top and if this difference in temperature is not corrected before the molten glass reaches the outlet the result is a great loss in production, since this uneven, or difference in, temperature causes uneven flow, which in turn causes uneven weight in the molten glass at the outlet. Variation in the character and quality of the molten glass in these particulars is not permissible.

Objects of the present invention are to provide an improved method of and apparatus for feeding molten glass in order to prevent this difference in temperature as between the molten glass at the top of the stream and the molten glass at the bottom of the stream, so as to deliver the molten glass at the outlet or severing point approximately uniformly heated throughout and approximately of uniform weight throughout the stream.

Other objects and advantages of the invention will be apparent from the following description, reference being made to the annexed drawings, in which—

Fig. 1 is a top plan view of my improved apparatus for feeding molten glass to obtain the objects and advantages of the invention.

Fig. 2 is a vertical longitudinal sectional view approximately on the line 2—2 of Fig. 1.

Fig. 3 is an irregular horizontal sectional view approximately on the line 3—3 of Fig. 2.

Fig. 4 is a vertical cross sectional view approximately on the line 4—4 of Fig. 2.

Fig. 5 is a vertical cross sectional view approximately on the line 5—5 of Fig. 2.

Fig. 6 is a vertical longitudinal sectional view of the discharge or outlet end of the apparatus showing a modification of a part of the invention.

The drawings illustrate my invention embodied in a forehearth in communication with and receiving molten glass from a furnace 1. In this forehearth the molten glass flows from the furnace 1 under a refractory block 2 into a heating chamber 3. The block 2 extends entirely across and downwardly into the forehearth and provides a passage 4 from the furnace into the heating chamber 3. Heat is applied to the top surface of the glass in the chamber 3 through an opening 5 and is supplied by a burner 6. The heat is confined in and sealed against escape from the chamber 3 by the wall block 2 at one end, by the side walls 7 at the sides of said chamber, a top wall 8 and by a refractory wall forming block 9 at the opposite end of the heating chamber from the block 2. The block 9 extends downwardly into the upper surface of the molten glass and provides a passage 10 for the flow of the molten glass from the chamber 3 into a second heating chamber 11. In passing from the heating chamber 3 into the heating chamber 11 the upper and hotter surface of the molten glass moves downwardly and under the wall forming block 9 while the colder and bottom portion of the molten glass moves upwardly toward the passage 10 along an inclined bottom wall 12, thus partially comingling or mixing the upper and lower parts of the stream of molten glass.

The heating chamber 11 is formed by wall structure including a refractory top wall 13 in connection with two spaced downwardly extended refractory walls 14 (Fig. 5) seating upon the upper edges of refractory side walls 15 rising from a refractory bottom wall 16 and thereby forming the combined heating chamber 11 and a passage for the flow of the molten glass. The refractory top wall 13 is also connected with downwardly extended refractory walls 17 separated from the walls 14 by heating spaces or chambers 18. An opening 19 to the heating chamber 11 is provided in the top wall 13 for the admission of heat from a burner 20 disposed adjacent to said opening 19. The heating chambers or spaces 18 are supplied with heat through openings 21 into which heat is supplied from adjacently disposed burners 22.

Satisfactory results under some conditions may be obtained by eliminating the burner 20, its opening 19, and the combustion space in the chamber 11. In that event the top wall 13 will be lowered by the elimination of the downwardly extending parts 14 and 17.

The lower edges of the walls 17 seat upon the upper edges of refractory walls 23 rising from the sides and end of a substantially U-shaped continuous heating chamber 25 into which the heating chambers 18 open (Fig. 5).

From the heating chamber 11 the spent gases and fumes pass out through an opening 26 through which the flow regulator block 27 extends. The gases passing through the opening 26 keep the flow regulator block 27 hot. The block 27 is of refractory material and is narrower than the space between the wide walls 15 of the trough or passage through which the molten glass flows. The block 27 extends downwardly beyond the plane of the lower end of the refractory wall forming block 9 and cooperates with the bottom wall 16 to form a space 28 below the block 27 and with the side walls 15 to form spaces 29 at the sides of said block 27 extending upwardly in continuation of the sides of the space 28 to cause at each side a flow of molten glass 30 (Fig. 2) through said spaces 29 at the sides of the block 27 in connection with the bottom stream of glass 31 passing through the space 28 below the block 27. The merged stream of molten glass 31 flows through a trough 32 composed of refractory material and having a top 33 also of refractory material. From the trough 32 the stream of molten glass passes through an opening 34 into a chamber 35 formed by a cylindrical wall 36 having the passage 34 therethrough and from the chamber 35 the molten glass passes to the discharge outlet 37. The parts 16, 32 and 36, which are composed of refractory material, are mounted in and supported by an appropriately shaped heat resisting metallic support casing 38 mounted within the chamber 25 (Figs. 2, 3 and 4). The outer refractory members forming the outer walls of the chambers 18 and 25 are enclosed and supported by a metallic frame casing 39. As is obvious from the drawings, the inner support or frame 38 is supported on the outer frame 39.

As indicated, the member 36, is cylindrical or tubular and the upper end thereof contains a filler plug 40 to fill the space which otherwise might be detrimental to the operation of the apparatus, especially when the feed control is by compressed air. The metallic element 38 has an upwardly tubular extension 41 above the filler plug 40 and supports a sealing plate 42 provided with an opening 43 through which a pipe 44 opens to provide a connection with the source of plus and minus air pressures.

Burner ports 45 (Fig. 2) open into the chamber 25 adjacent the tubular portion 41 of the metallic cover 38 to admit into said chamber 25 heat from adjacently disposed burners 46 in order to heat the front of the tubular part 41 and maintain heat around the part 38 and within said chamber 25. By this construction and arrangement of the burners and the heating chambers, I easily apply heat to the under side of the trough along and through which the molten glass flows and control the temperature both of the lower and upper surfaces of the flowing glass. Thus, I easily overcome and eliminate that trouble and difficulty in regulating the temperature heretofore encountered both in the plunger type and the air controlled feeder type of apparatus, which trouble and difficulty attempts have heretofore been made to overcome by complicated mechanical devices.

Heretofore in apparatus of this general class, there has been considerable loss of production because of the breaking of the clay parts. In the plunger type feeder it is the plunger that has caused difficulty and in the air controlled feeder type the tube or air bell has caused difficulty. By my novel construction disclosed, including the metallic armor 38 for the refractory clay parts, I provide a suspended trough through a heated chamber which permits the under portion of the flowing glass to be heated approximately to the same extent as the upper surface of the flowing glass. The heating of the glass in the vertical tube 36 from the outside down almost to the outlet 37, rather than attempting to force heat downwardly through a great depth of molten glass from above, is a great advantage. By my improved construction, which provides for heating flowing glass along all sides, I have eliminated the various faults and difficulties mentioned.

It should be clear that by removing the sealing plate 42 and the filler plug 40, I can provide a reciprocating plunger type of feeder control, as shown in Fig. 6. Fig. 6 of the drawings discloses the same construction as that illustrated in the preceding views of the drawings and as heretofore described, with the exception that the parts 41, 42 and 44 have been removed and a reciprocating plunger 47 substituted. The plunger is shown immediately over the outlet 37 for operation in a familiar way to expel and retract the stub of glass below the outlet after severance. Any usual means may be employed to adjust the lower end of the plunger to a position relative to the working level 48 of the glass in the tube 36.

The block 27 is adjustable vertically and laterally. The upper end of the block 27 is attached to a bracket 49, which is secured to an arm 50. The arm 50 is adjustable inwardly and outwardly along a bracket 51 mounted for vertical adjustments on supporting rods 52. The connection 53 that secures the arm 50 to the bracket 51 is adjustable, so that the block 27 may be moved laterally in either direction and the bracket 51 is adjustable vertically in order to adjust the block 27 vertically.

In operation the molten glass flows at a rate determined by the position of the block 27, so that the amount of glass accumulated over the outlet orifice 37 is regulated by said block 27 and the amount of time between discharges. Thus, in making large articles the block 27 is raised to allow more glass to flow into the tube having the outlet orifice and, since larger articles must be made at slower speed, the working level of the glass above the outlet orifice will be higher than it is when small articles are being made. When small articles are made the block 27 is lowered and the amount of time between discharges and severings of the molten glass is diminished, so that a smaller quantity of glass accumulates above the outlet orifice and the working level of the glass will be lower. Consequently with each change in weight of the articles to be made, there will be a change in the working level of the glass in the tube which is regulated in part by the position of the block 27.

The molten glass at the bottom is directed upwardly toward the passage 10 along the upwardly inclined bottom wall 12 and enters the heating chamber 11 from which the spent gases and fumes pass through the opening 26 around the block 27. The block 27 may be adjusted in the manner described to regulate the flow of the molten glass in accordance with the weight of the articles to be made. The trough or passage along which the molten glass flows and the chamber 35 are subjected to external heat confined within the heating chamber 25.

The molten glass is forced out through the orifice 37 either by operation of air feeder mechanism variable relative to the speed of flow as desired, it being unnecessary to illustrate and describe herein such air feeder mechanism; or by operation of the plunger 47. In use of the air feeder mechanism or the plunger device the quantity of glass for the gob is controlled by the regulator block 27 and the working level in both cases varies approximately the same. In the use of the plunger the length of the stroke is fixed and the stroke is adjustable relative to the speed of flow of the molten glass but the effective working area of the plunger increases with a rise in the working level of the glass. In operation with air feeder mechanism the length of the stroke is fixed and the speed of the pump stroke is adjustable relative to the speed of the flow and there is also an automatic variation in the effective area with a variation in the working level. This is true because if the pump is set to meet the conditions required to make articles of low weight, there is a low working level and, if the working level is raised to make articles of greater weight, the volumetric dimensions above the working level will be automatically decreased relative to the fixed volume of air delivered by the pump, resulting in an increased pressure on the glass. If the increased pressure is too great the speed of the pump stroke should be decreased relative to the flow of the glass. On the retractive stroke of either the air or the plunger adjustments are made to meet conditions created by changes in the temperature. For instance, when the temperature is increased for the small job, the fluidity of the glass is increased and the hotter temperature offers less resistance to the gravity pull, as a consequence of which the speed of the pump must be increased to stop the flow and to reverse the flow and the extent thereof. If the working level is raised for a larger job, the volume of the space above the glass is decreased relative to a fixed volume of air withdrawn and this will increase the minus pressure applied to the surface of the glass for handling a larger job.

It should now be apparent that this invention obtains all of its intended objects and purposes efficiently and satisfactorily. The invention may be varied within the scope of equivalent limits and I contemplate such variations as may be advisable.

I claim:

1. An apparatus for feeding glass comprising refractory walls forming a trough for the flow of the glass, means for applying flame to glass in said trough, a block extending into said trough and spaced from the walls thereof, means for supporting said block in different adjusted positions to vary and control the flow of the glass, means forming a heating chamber at the sides and bottom of said trough, and means for heating said chamber.

2. In apparatus for feeding molten glass, a trough communicating with a melting furnace, closed at its front end to form a pressure chamber above an open orifice in the bottom of the trough, and formed of refractory clay parts, a metallic armor of high heat resistance supporting said trough and surrounding its outer end, walls spaced from said trough and forming a chamber about the trough at its bottom sides and front end, said walls being supported by a frame, said armor likewise being supported by the said frame, and means for heating said chamber.

3. In a device of the kind described, a glass furnace, a first heating chamber appended thereto, said heating chamber being adapted to receive glass from the furnace and to provide a heating space thereabove, means for applying heat in said chamber to the upper part of the glass, a second heating chamber, means providing a passage between said chambers, said means causing mixing of the heated upper part of the glass and the cooler lower part from said first chamber, means for applying heat substantially all around said second chamber, means providing an outlet orifice for the glass, and means between said second chamber and said outlet orifice for controlling the flow of glass from the former to the latter.

4. In a forehearth, a first heating chamber, a second heating chamber in communication with said first chamber, an outlet chamber, means providing communication between said second chamber and said outlet chamber, the glass flowing from said first chamber to said second, and thence through said communicating means to said outlet chamber, means supplying heat to said chambers, and means for varying the capacity of said communicating means to control the quantity of glass issuing from the second chamber into the outlet chamber.

5. The method of feeding glass including the steps of directing a stream of molten glass along a defined course, mixing the glass at a point in the course by causing the bottom part of the stream to pass upwardly, applying heat to the top part of the stream in said course, applying heat to the bottom part of said course adjacent the point of mixing, and regulating the quantity of glass flowing by varying the area of said course.

6. The method of feeding glass including the steps of directing a stream of molten glass along a defined course, applying heat to the top of the glass in a portion of said course, subsequently mixing the glass by causing the cooler bottom part to flow upwardly and the top part to be drawn downwardly, supplying heat substantially all around said stream adjacent to and subsequent to said mixing point, and regulating the quantity of glass flowing by varying the cross-sectional area of said course.

7. In a forehearth, a trough for conducting a stream of molten glass, an orifice at one terminus of the trough, means causing a portion of the stream of glass in said trough to be substantially U-shaped, said U-shaped portion lying in a vertical plane, and means for supplying heat around the bottom and sides of said U-shaped portion.

8. In a forehearth, a supply chamber, an orifice, and a trough for conducting a stream of molten glass from said supply chamber to said orifice, a plunger extending into said trough for varying the cross-sectional area thereof, and means for supporting said plunger capable of vertically and laterally adjusting said plunger with respect to said trough.

9. In a forehearth, an orifice, a trough for conveying a stream of molten glass to said orifice, means causing a portion of the stream of glass in said trough to be substantially U-shaped, said U-shaped portion lying in a vertical plane, and means for supplying heat to the top, and around the bottom and sides of said U-shaped portion.

10. In a forehearth, a chamber, a trough leading from said chamber, said chamber being adapted to contain molten glass with an air space thereabove, said trough being adapted to convey glass from the chamber with an air space thereabove in communication with the air space of the chamber, the upper wall of said trough having an opening therein, means supplying heat to said chamber in the space above the glass, said heat being conducted into the space above the glass in the trough and out the opening in the trough, and means extending into said trough to control the size thereof, said means extending through said opening.

11. In a forehearth, inner walls defining a heating chamber to receive molten glass, outer walls spaced from the inner walls and defining a heating space around said chamber, said heating space being out of communication with said chamber, means for supplying heat inside said chamber, and separate means for supplying heat to said space.

12. In a forehearth, inner walls defining a heating chamber, a trough, and an outlet chamber, outer walls, there being a space between said outer walls and said heating chamber, and space between said trough and said outlet chamber, and said outer walls, said spaces being out of communication with the interiors of the said heating chamber, trough, and outlet chamber, means for supplying heat to the surface of the glass in said heating chamber, means to supply heat to the space between said outer walls and said heating chamber, and means to supply heat to the space between said trough and outlet chamber, and said outer walls.

13. In a forehearth, an outer metallic supporting frame, an inner metallic supporting frame spaced from said outer frame and supported thereon, said inner frame supporting refractory walls defining a chamber for molten material and having an outlet at the bottom thereof, said outer frame likewise supporting a refractory lining, the space between said frames constituting a heating chamber.

14. In a forehearth for molten glass, an outer casing, an inner casing spaced from said outer casing to define a heating chamber between said casings, said inner casing including a metallic frame supported on said outer casing, said frame comprising a chamber having an outlet in the bottom thereof, and said chamber being lined with refractory material, the refractory material being supported and protected by said frame, and means on the top of said chamber to force glass from said orifice.

15. In a forehearth, a heating chamber, a trough leading therefrom, a gate adapted to extend into the trough to define a variable U-shaped passage, means for effecting vertical adjustment of the gate, and means for effecting lateral adjustment of the gate, whereby to vary the U-cross-section.

16. In a forehearth, a first heating chamber to receive molten glass from a furnace, a second heating chamber, a passage between the two chambers of a size and disposition to converge the glass flow in passing therethrough, a trough leading from the said second heating chamber, means in the trough to adjustably control the cross-section of glass flow therethrough, an outlet chamber into which the trough opens having an orifice in the bottom thereof, means to force glass from said orifice, said chambers and trough being defined by refractory walls, a metallic casing supporting said walls, a second casing surrounding the metallic casing defining a heating space thereabout uncommunicating with the said chambers and trough and supporting the same, and separate means for introducing heat into the first chamber, the second chamber, and the heating space about the metallic casing.

SAMUEL G. STUCKEY.